United States Patent [19]

Cooksey

[11] Patent Number: 5,017,068
[45] Date of Patent: May 21, 1991

[54] PLASTIC SCREW ACCESSORY

[75] Inventor: James D. Cooksey, El Toro, Calif.

[73] Assignee: The Cooksey Corp., Laguna Hills, Calif.

[21] Appl. No.: 596,320

[22] Filed: Oct. 12, 1990

[51] Int. Cl.⁵ ............................................. F16B 23/00
[52] U.S. Cl. .................................... 411/373; 403/282; 403/361
[58] Field of Search ............... 411/371, 372, 373, 377, 411/396, 429, 431, 430; 74/553; 16/121; 403/282, 361

[56] References Cited

U.S. PATENT DOCUMENTS

| | | | |
|---|---|---|---|
| 3,529,508 | 9/1970 | Cooksey | 411/374 |
| 4,571,111 | 2/1986 | Keogh | 74/553 X |
| 4,638,133 | 1/1987 | Dvorak et al. | 403/361 X |

Primary Examiner—Rodney M. Lindsey
Attorney, Agent, or Firm—Poms, Smith, Lande & Rose

[57] ABSTRACT

A plastic accessory having a retaining socket for use with socket head cap screws, the plastic accessory engagingly receiving the head of the screw and having a hub concentrically positioned within the retaining socket and co-axial with the socket. The retaining socket of the plastic accessory is shaped to allow for engagement with the socket head cap screw and the hub of the plastic accessory extends into the socket of the head in the screw. The upper body portion of the hub, upon engagement with the screw, is both sheared and reshaped to a configuration corresponding to that of the head socket of the screw. A plurality of primary grips and a plurality of secondary grips are positioned on the inside wall of the retaining socket of the plastic accessory for absorbing the screw head tolerance and gripping the peripheral surface of the head of the screw. The screw head is resiliently received by deforming, shearing and press fitting the retaining socket of the plastic accessory.

6 Claims, 3 Drawing Sheets

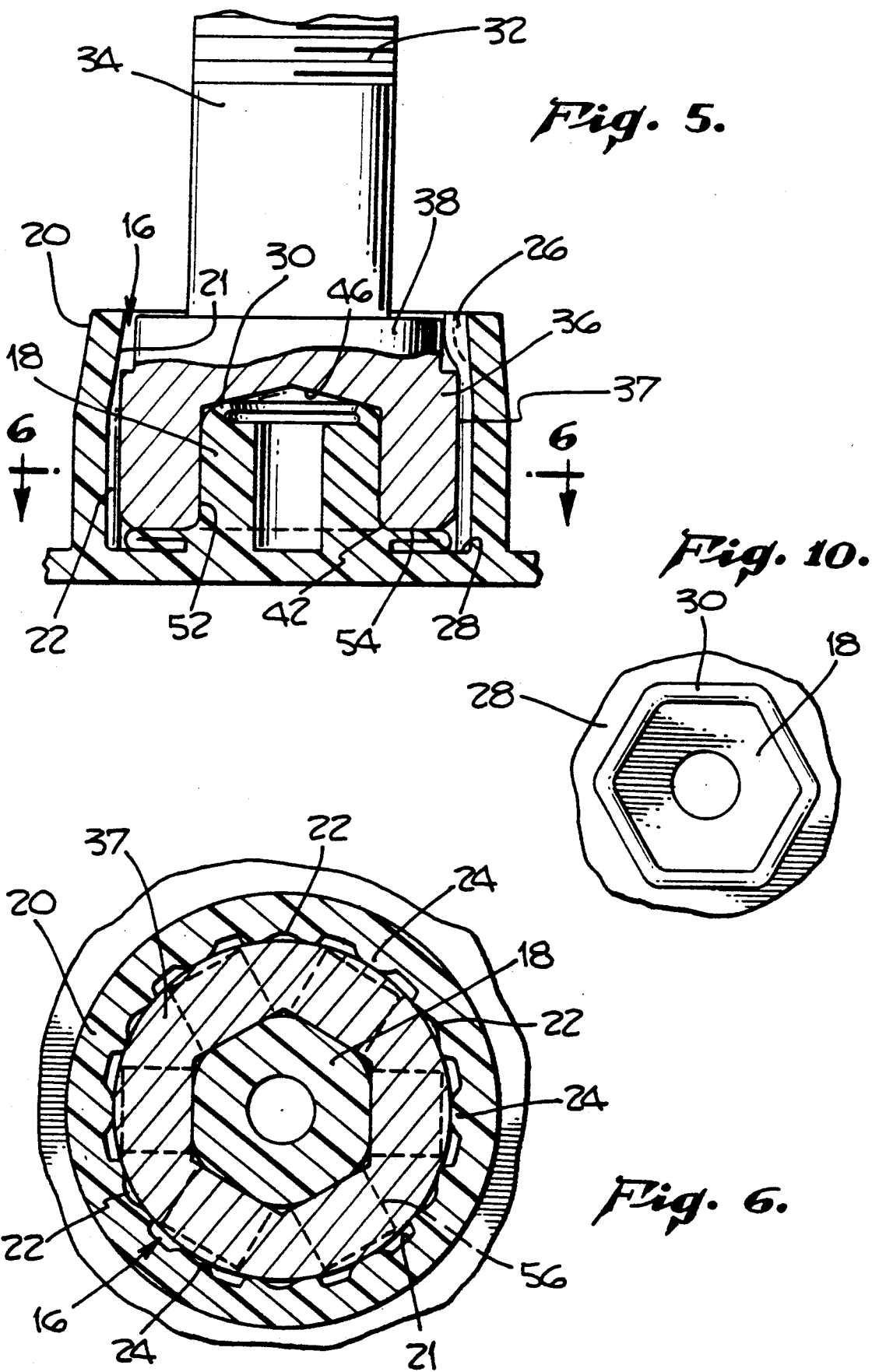

PLASTIC SCREW ACCESSORY

BACKGROUND OF THE INVENTION

Socket head cap screws are used in a variety of applications and it is frequently desirable to cover the head of the screw. A plastic accessory is often used for this purpose and may take a multitude of forms, e.g., a dial, insulator, decorative cover, adjustment foot and a thumb screw. The plastic accessory may also be formed as a knob permitting the cap screw to be tightened or loosened by hand.

While plastic accessories used in combination with a variety of screws, are known in the art, they are typically molded onto the screw or adhesively attached thereto. The torque requirements of the plastic accessories, however, not only serve to make the requisite molding or adhesives costly but also necessitate expensive and specialized tooling.

Thus, it is desirable to have a plastic accessory which not only may be securely attached to the head of a socket head cap screw, but also is functionally capable of withstanding a broad range of screw tolerance specifications. Further, in consideration of the cost and ease factors as previously discussed, it is desirable to attach the plastic accessory without adhesives or special tooling. The plastic accessory must, however, be capable of withstanding and producing, without failure or deterioration, the requisite mechanical torque. An example of such a plastic accessory is disclosed and described in U.S. Pat. No. 3,529,508.

In recent years, the manufacturing techniques for, and specifications of, socket head cap screws have changed. For example, minor diameter tolerances are now absorbed near the screw head creating a back draft portion thereby decreasing the screw head and plastic accessory contact area. Additionally, it has become more typical in manufacturing to add a lead-in angle to the drive socket portions of the screw head. The lead-in angle alters the engaging characteristic and subsequently the torque characteristic of the plastic accessory.

With respect to specifications, the standards to reference for manufacturing socket head cap screws require that a plastic accessory overcome the head diameter tolerances while still maintaining acceptable torque and connections between the screw and plastic accessory. For example, the latest Japanese Industrial Standard (JIS-B-1176-1988) as revised in 1988 for an M10 hexagonal socket head cap screw has a head diameter which may vary from 15.73 mm to 16.27 mm. This variance corresponds to an additional 0.27 mm or 60% more permissible head diameter tolerance the accessory retaining socket must now overcome. The existing M10 United Kingdom standard for a hexagonal socket head cap screw provides that the head diameter may vary from 15.57 mm to 16.00 mm and the M10 American Standard has a head diameter variance of 15.67 mm to 16.00 mm. Additionally, the sooket head heiqht, the key engagement dimension and the concentricity of the socket within the head cap screw are all subject to manufacturing variances and tolerances.

SUMMARY OF THE INVENTION

The plastic accessory of the present invention is constructed so as to allow for and accommodate the manufacturing variances within the normal and accepted range of inch and metric tolerances. Further, the plastic accessory of the present invention provides a rigid, secure attachment to the head of a socket head cap screw that is capable of meeting the functional mechanical torque requirements without cracking or shearing. The plastic accessory also eliminates the need for costly special tooling and equipment.

Generally stated, the plastic accessory of the present invention for use with inch and metric socket head cap screw has a retaining socket that engagingly receives the head of the screw. The retaining socket has a hub concentrically positioned therein and that is co-axial with the socket. The retaining socket is shaped to allow for engagement with the socket and the hub extends into the socket of the head in the screw. The present hub will be somewhat greater instead of somewhat less than the minor drive socket depth. The hub could take on a variety of geometrical, cross-section configurations, but for manufacturing simplicity the preferred embodiment is shown to be a circle. The present hub, which includes a malleable tolerance absorbing upper lip portion, has a lower body portion that, upon engagement with the screw, is sheared to a configuration corresponding to that of the head socket of the screw. A plurality of primary grips and a plurality of secondary grips are positioned on the inside wall of the retaining socket of the plastic accessory for absorbing the screw head tolerance and gripping the peripheral surface of the head of the screw.

The screw head is resiliently received by deforming, shearing and press fitting the retaining socket of the plastic accessory. Still further, the plastic accessory of the present invention may include pairs of resilient positioning ribs to further minimize problems created by manufacturing deviations.

It is believed that a better understanding of the present invention, as well as a recognition of how the present invention achieves the foregoing objects and attains various additional advantages, will become apparent to those sufficiently skilled in the art from a consideration of the following detailed description of the present invention. During the following detailed description, reference will be made to the appended sheets of drawings that are described briefly immediately below.

DESCRIPTION OF THE DRAWINGS

FIG. 5 a top view of a hexagonal type socket head cap screw taken along plane 3—3 of FIG. 2.

FIG. 5 is a partial cross-sectional view of a socket head cap screw with the head inserted into the retaining socket of an accessory constructed in accordance with the invention.

FIG. 6 is a partial sectional view of a socket head cap screw with the head inserted into the retaining socket of an accessory constructed in accordance with the invention as taken along the plane of 6—6 of FIG. 5.

FIG. 10 an enlarged partial bottom view of the plastic accessory center hub of the present invention engaged with a socket head cap screw.

DETAILED DESCRIPTION OF THE ILLUSTRATED EMBODIMENTS

Figure 1:
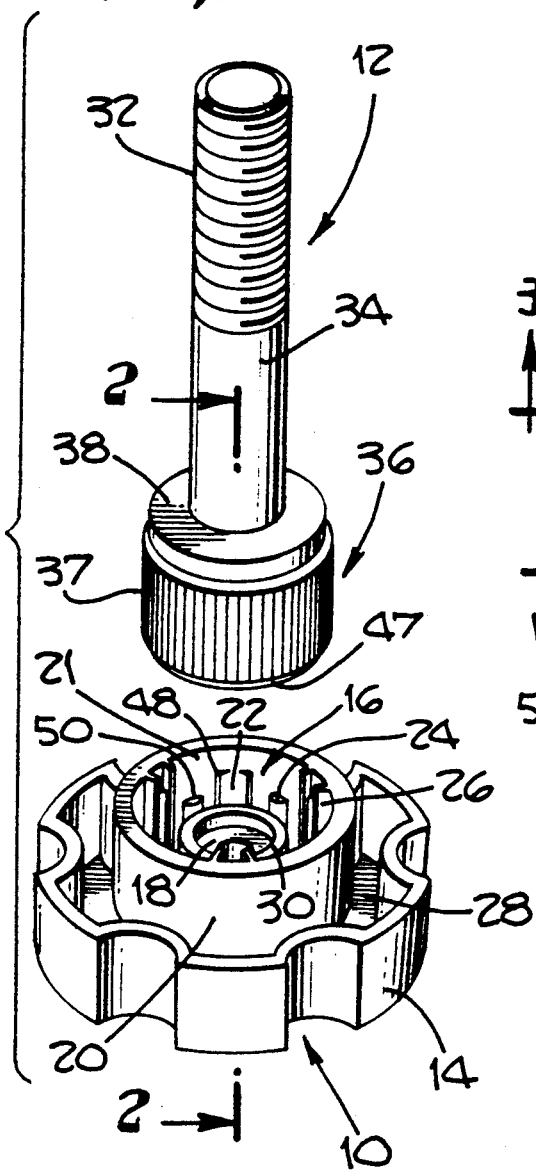
FIG. 1 is a perspective view of the plastic accessory and a typical socket head cap screw.

Referring first to FIG. 1, a perspective view of the plastic accessory 10 of the present invention is shown in conjunction with a typical socket head cap screw 12. The plastic accessory 10 includes an outer gripping surface 14, a retaining socket 16 and a hub 18. While the outer gripping surface 14 is shown in the preferred embodiment to have a beveled surface, it is contemplated that gripping surface 14 is not so limited. For example, gripping surface 14 may be a rigid, circular surface or a polygonal surface. Any change to gripping surface 14 should, however, be designed so as to facilitate the easy gripping and manipulation of plastic accessory 10. While accessory 10 is illustrated as a knob it is( of course, not intended to be limited to such a use or application. Other applications contemplated to be within the scope of this invention were discussed above in the section titled BACKGROUND OF THE INVENTION.

Positioned on the inside portion 21 of wall 20 of retaining socket 16 are a plurality of primary grips 22, a plurality of secondary grips 24, and at least one pair of resilient positioning ribs 26. Primary grips 22, secondary grips 24, and positioning ribs 26 are discussed in greater detail within.

The hub 18 of plastic accessory is concentrically positioned within the retaining socket 16 and is coaxial therewith. Hub 18, similar to retaining socket 16, is integrally formed with the bottom surface 28 of plastic accessory 10. Hub 18 includes a malleable upper lip portion 30 and has a total height, including malleable upper lip portion 30, of less than the depth of retaining socket 16.

Turning to briefly address the socket head cap screw 12, cap screw 12 includes a threaded portion 32 and a shank portion 34 and a head portion 36. Head portion 36 has a peripheral surface 37 which is shown in FIG. 1 as beveled. Typically, in the manufacturing of socket head cap screw 12, certain minor diameter tolerances are absorbed in a back draft portion 38. The manufacturing tolerances and deviations as well as exemplary standards to reference were previously discussed in the BACKGROUND OF THE INVENTION.

Figure 2:
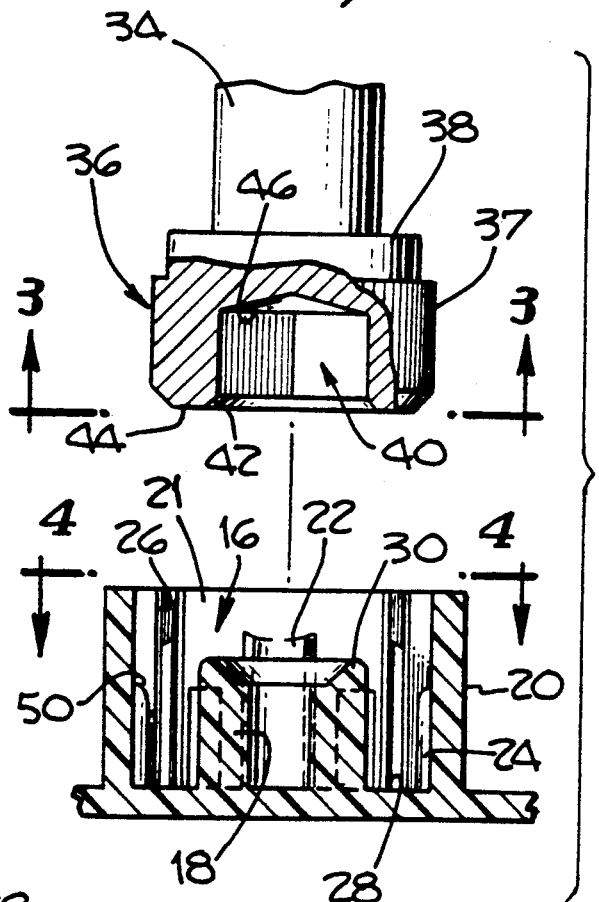
FIG. 2 is a partial sectional view of the plastic accessory and a typical socket head cap screw taken along plane 2—2 of FIG. 1.

Turning now to address FIG. 2, FIG. 2 is a partial sectional view taken along plane 2—2 of FIG. 1. The drive socket 40 of head portion 36 is shown to have a lead-in angle 42 from the flat head surface 44 of head portion 36. Lead-in angle 42 decreases the potential center shear-hub engagement and driving force that is generated by existing plastic accessories. In order to compensate for the resultant decrease in engagement forces, malleable upper lip portion 30 is provided. This provision allows hub 18 full penetration regardless of depth tolerance of drive socket 40 (best shown in FIG. 5). Malleable upper lip portion 30 is initially sheared by the minor dimension of drive socket 40 and then is deformed by drive socket bottom 46 of drive socket 40. It is important that upper lip portion 30 be sufficiently malleable because when being deformed by drive socket bottom 46 it must not create a significant internal pressure. A significant internal pressure will create a force tending to push socket head 36 out of retaining socket 16 when less than maximum drive socket depth is encountered.

FIG. 2 also depicts primary grips 22, secondary grips 24 and resilient positioning ribs 26. It should be noted that secondary grips 24 are shorter than primary grips 22 and, in the preferred embodiment, resilient positioning ribs 26 are positioned on alternating primary grips 22 at the upper portions thereof. The interaction and forces of primary grips 22, secondary grips 24 and resilient positioning ribs 26 upon head portion 36 are discussed by reference to FIG. 4, a partial bottom view of the plastic accessory of the present invention.

Figure 3:
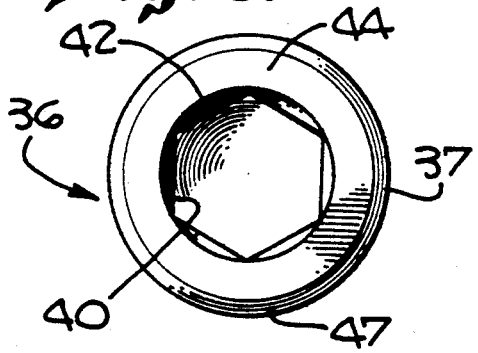

Turning to address briefly FIG. 3, FIG. 3 is a top view of a hexagonal type socket head cap screw taken along plane 3—3 of FIG. 2. Head surface 44 defines the surfaces for drive socket 40, shown to have a hexagonal cross-section configuration. It should be appreciated 1 that head surface 44 is not limited to a cross-section configuration. By way of working example, the nominal size of drive socket 40 for an M10 hexagonal socket head cap screw is 8.00 mm (See, e.g., M10 American Standard and M10 Japanese Industrial Standard). While manufacturing variances exist, it is typical that peripheral surface 37 of socket head 36 has a rounded edge 47 where it meets head surface 44. Retaining socket 16 is capable of compensating for manufacturing variances and tolerances, e.g., diameter tolerances. As is discussed immediately below in connection with FIG. 4, rounded edge 47 and peripheral surface 37 are acted upon by various forces by primary grips 22, secondary grips 24 and resilient ribs 26 as head 36 is inserted into retaining socket 16.

Figure 4:
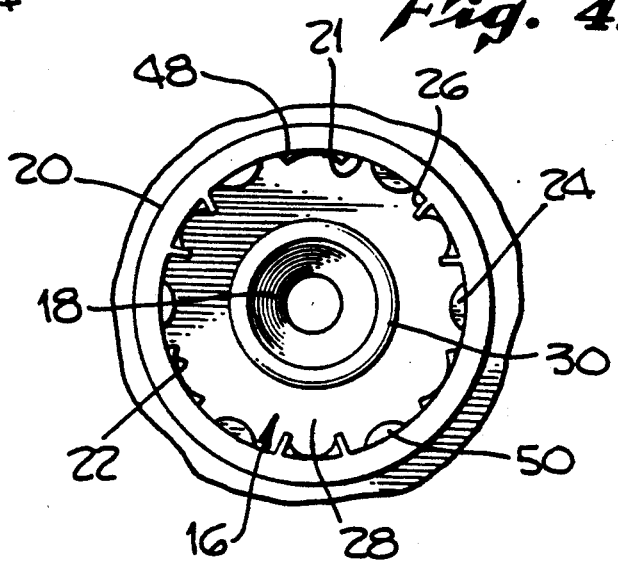
FIG. 4 is a partial bottom view of the plastic accessory of the present invention taken along plane 4—4 of FIG. 2.

With reference now to FIG. 4, primary grips 22 have a substantially concave curvature and, in the preferred embodiment, extend approximately three-quarters of the way up inside portion 21 of wall 20 of retaining socket 16 (best shown in FIG. 1). A guide edge 48 is provided on primary grips 22 and is beveled to create a gradual slope at the area where guide edge 48 meets the inside portion 21 of wall 20 of retaining socket 16. Guide edge 48 helps to center the screw head 36 above hub 18 thereby eliminating uneven shear upon primary grips 22 and hub 18. The upper portion of retaining socket 16, at and above the upper portion of primary grips 22, expands as screw head 36 enters. As screw head 36 passes over guide edge 48 and into contact with primary grips 22, inward pressure from retaining socket 16 is created and distributed from primary grip 22 area contact points as discussed later in more detail in connection with FIGS. 7,8 and 9.

Secondary grips 24 are generally of a convex curvature and extend, in the preferred embodiment, approximately one-half way up inside portion 21 of wall 20 of retaining socket 16 (best shown in FIG. 1). Similar to primary grips 22, secondary grips 24 include a slightly beveled upper portion, secondary lead edge 50, best shown in FIGS. 1 and 2. The upper portion of retaining socket 16 will flatten between the grips as head 36 enters socket 16. As shown in the preferred embodiment, the longer concaved primary grips 22 exert twelve points of force in a spring-like fashion at six equal places along peripheral surface 37 spaced sixty (60°) degrees apart. It should be appreciated that the force lines will vary in spatial relationship as the number of primary grips 22 varies.

It should also be understood that in the preferred embodiment the combination of a concaved primary grip 22 and a convex secondary grip 24 is used to enhance the degree of deformation and pressure points in a given circle. The combination still allows adequate space between the primary grips 22 and secondary grips 24 for the wall 21 to flex without failure.

When the secondary grips 24 are reached by the penetration of head 36, the points of flattening spring-like pressure will change to thirty (30°) degrees. The change to thirty (30°) degrees is based upon there being six secondary grips, as shown in the preferred embodiment. It is of course contemplated that the number of both primary grips 22 and secondary grips 24 will vary. When completely assembled, an outwardly generated pressure exists at each grip contact point and the press-fit connection between the head 36 and socket 16 is maximized. Resilient positioning ribs 26 extend from the upper portion of primary grips 22 and are sufficiently resilient to expand and return to contact back draft portion 38 of head 36. This is discussed in greater detail below.

FIG. 5 shows a partial cross-sectional view of a socket head cap screw 12 with the head 36 inserted into the retaining socket 16 of accessory 10. As can be seen in FIG. 5, lead-in angle 42 has sheared a portion of upper lip 30 prior to contact with drive walls 52 of drive socket 40. As the necessary pressure is applied to screw 12 to push head 36 into socket 16, drive walls 52 shear a hub chip 54 from hub 18. This chip 54 is trapped between the top of screw head 36 and bottom surface 28 of socket 16. It should be noted that the amount of space required for hub chip 54 may be predetermined and appropriate allowances made, but hub 18 is also capable of compensating for certain depth manufacturing tolerances by lip 30 being reshaped by drive socket bottom 46.

Also seen in FIG. 5 is the functioning of positioning ribs 26. Positioning ribs 26 fold over after being deformed between retaining socket 16 and head portion 36 (best shown in FIG. 7). This adds additional pressure forcing the retaining socket 16 to go out of round and creating an inward pressure on the areas of wall 20 and inside portion 21 of retaining socket 16 that do not have positioning ribs 26. After head portion passes downward toward surface bottom 28, the trapped positioning rib areas spring back to exert pressure upon back draft portion 38 of the screw head. The result is a more effective press fit.

FIGS. 5 and 6 are illustrative of the deformation of hub chip 54. Shadow lines 56 in FIG. 6, a partial sectional view of head 36 of socket head cap screw 12 inserted into plastic accessory 10 in accordance with the present invention, and taken along plane 6—6 of FIG. 5, show the overlay of hub chips 54 upon bottom surface 28 of socket 16. Also shown in FIG. 6 is the fact that the deformation of primary grips 22 and secondary grips 24 at contact areas with screw head 36 may vary slightly to correspond to the screw head tolerance.

Figure 7:
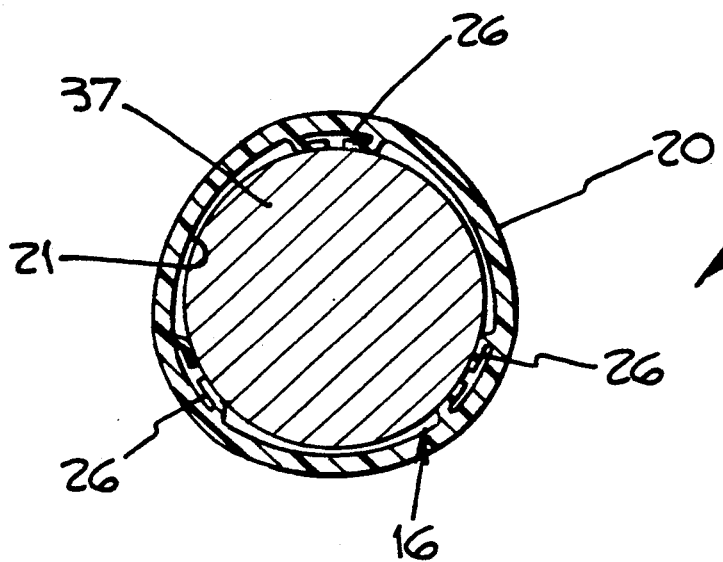
FIG. 7 is a partial cross-sectional view showing the accessory retaining socket positioning rib area cngaged with the screw head of a socket head cap screw.
Figure 8:
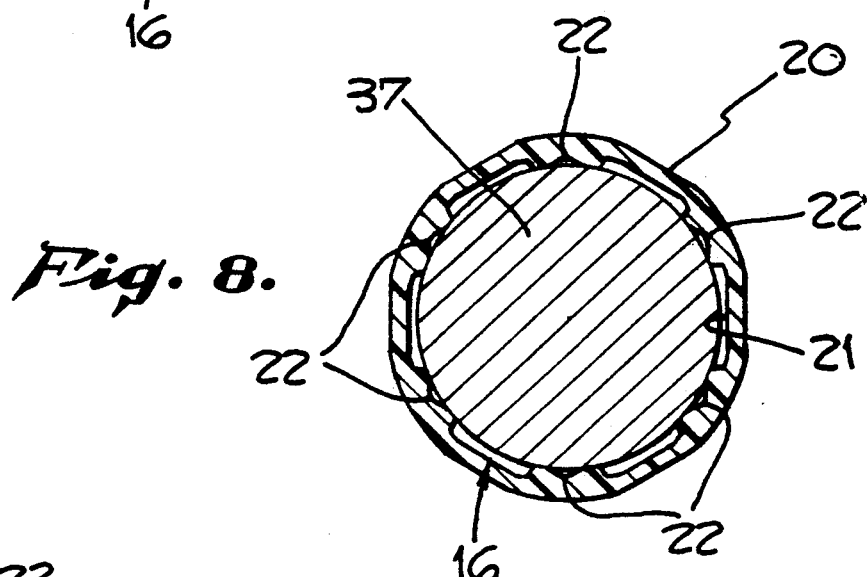
FIG. 8 is a partial cross-sectional view showing the accessory retaining socket primary grip area engaged with the screw head of a socket head cap screw.
Figure 9:
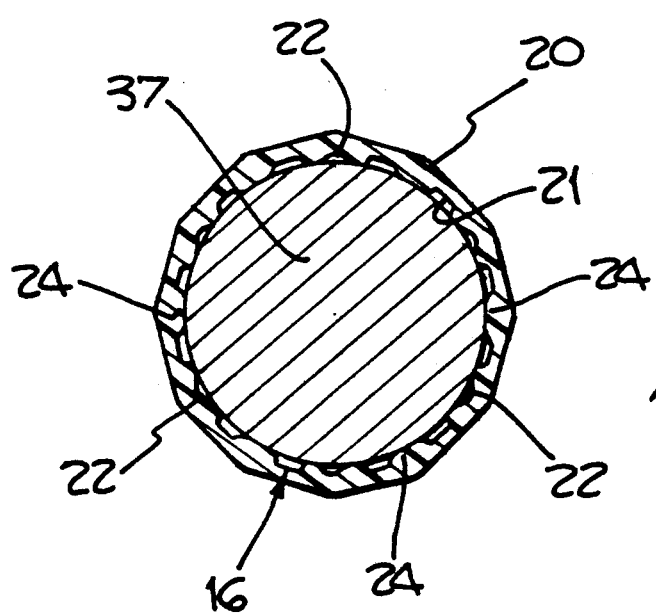
FIG. 9 is a partial cross-sectional view showing the accessory retaining socket primary and secondary grip area engaged with the screw head of a socket head cap screw.

Referring collectively to FIGS. 7, 8 and 9, FIGS. 7, 8 and 9 show what systematically occurs when screw head 36 is pressed into accessory retaining socket 16. This movement allows the upper portion of retaining socket 16 to be most resilient (see FIG. 7), the center section of retaining socket 16 to be somewhat resilient (see FIG. 8.) and the lower portion of retaining socket to be least resilient. Thus, retaining socket 16 is allowed to follow and maintain pressure to the back draft shape of screw head 36.

FIG. 7 shows how screw head 36 folds over and traps the positioning ribs 26 at 120 degrees contact points, upon being inserted into retaining socket 16. Accessory wall 20 and inside portion 21 between those points is flattened in a resilient manner.

FIG. 8 shows the deforming effect that screw head 36 has on primary grip 22 and the contact pressure points at 60° that flatten accessory wall 20 and inside portion 21 between those points in a resilient manner.

FIG. 9 shows the deforming effect that screw head 36 has on both primary grip 22 and secondary grip 24 and the contact pressure points at 30 degrees that flatten accessory wall 20 and 21 between those points in a resilient manner.

Turning finally to FIG. 10, FIG. 10 is an enlarged, partial view of FIG. 4. Specifically, FIG. 10 shows that after socket head cap screw is inserted into the plastic accessory 10, it is contemplated hub 18 may take on a variety of geometrical, cross-section configurations, to correspond to the screw drive socket 40. In the preferred alternative embodiment of FIG. 10, hub 18 is shown as having a hexagonal cross-section configuration. It should be appreciated that malleable upper lip portion 30 will take the configuration shape of the cross-section of screw drive socket 40 and the screw drive socket bottom 46.

The material comprising the plastic accessory ;0 of the present invention must be capable of being sheared, re-shaped and also exhibit resiliency in the manner described for any material. By way of example, the plastic accessory 10 may be formed of thermosetting or thermoplastic resin. Additionally, acetal, nylon, polycarbonate, or other engineering plastics or materials having the requisite characteristics of shear and resiliency may be used.

Having thus described a preferred exemplary embodiment of the plastic accessory in accordance with the present invention, it should be apparent to those skilled in the art that various additional objects and advantages have been attained by the within invention and that a variety of modifications can be made within the scope and spirit of the present invention, being limited only by the appended claims.

I claim:

1. An improved plastic accessory for use with a socket head cap screw in which said accessory has a retaining socket for engagingly receiving the head of said screw and a hub concentrically positioned within said retaining socket and coaxial therewith for engaging by a shearing and re-shaping relationship with said socket in the head of said screw, wherein the improvement comprises:
   a plurality of primary grips positioned on the inside wall of said retaining socket for absorbing tolerance and gripping the peripheral surface of the head of said screw; and
   a plurality of secondary grips positioned on the inside wall of said retaining socket and shorter than said primary grips for absorbing tolerance and securely engaging the peripheral surface of the head of said screw.

2. The improved plastic accessory as defined in claim 1, wherein said hub is capable of compensating for depth tolerances of said cap screw and includes a malleable upper lip portion which, upon engagement with said screw, is capable of being sheared and re-shaped to absorb the drive socket depth tolerance.

3. The improved plastic accessory as defined in claim 1, wherein at least one of said plurality of primary grips includes a pair of resilient positioning ribs that are entrapped by, and secure, a lower portion of said screw head.

4. The improved plastic accessory as defined in claim 1, wherein said plurality of primary grips are longer than said plurality of secondary grips and wherein all grip areas are of a geometrical configuration that allow for re-shaping as screw head diameters vary.

5. The improved plastic accessory as defined in claim 1, wherein said malleable upper lip portion is circular in shape.

6. An improved plastic accessory for use with a socket head cap screw in which said accessory has a diameter tolerance compensating retaining socket for engagingly receiving the head of said screw and a hub concentrically positioned within said retaining socket and coaxial therewith for engaging by a shearing and re-shaping relationship with said socket in the head of said screw, wherein the improvement comprises:

a plurality of primary grips positioned on the inside wall of said retaining socket for absorbing tolerance and gripping the peripheral surface of the head of said screw;

a plurality of secondary grips positioned on the inside wall of said retaining socket, and shorter in length than said plurality of primary grips, for absorbing tolerance and securely engaging the peripheral surface of the head of said screw;

first and second portions on said hub, said first portion having a tolerance absorbing malleable upper lip and said second portion, upon engagement with said screw, capable of being sheared and re-shaped to a configuration corresponding to that of said head socket of said screw; and resilient alignment ribs positioned at the upper portion of said retaining socket adjacent at least one of said plurality of primary grips and resiliently securing a lower portion of the screw head by being entrapped by said head.

* * * * *